(12) United States Patent
Boeer et al.

(10) Patent No.: US 9,725,078 B2
(45) Date of Patent: Aug. 8, 2017

(54) CABLING DEVICE AND ELECTRONIC BRAKE SYSTEM FOR A MODULAR HEAVY GOODS VEHICLE AND FOR A HEAVY GOODS VEHICLE

(71) Applicant: Goldhofer Aktiengesellschaft, Memmingen (DE)

(72) Inventors: Thomas Boeer, Ungerhausen (DE); Armin Baader, Erkheim (DE)

(73) Assignee: Goldhofer Aktiengesellschaft, Memmingen (DE)

( * ) Notice: Subject to any disclaimer, the term of this patent is extended or adjusted under 35 U.S.C. 154(b) by 16 days.

(21) Appl. No.: 14/366,406

(22) PCT Filed: Dec. 18, 2012

(86) PCT No.: PCT/EP2012/005222
§ 371 (c)(1),
(2) Date: Jun. 18, 2014

(87) PCT Pub. No.: WO2013/091828
PCT Pub. Date: Jun. 27, 2013

(65) Prior Publication Data
US 2015/0298669 A1   Oct. 22, 2015

(30) Foreign Application Priority Data

Dec. 19, 2011   (DE) .................. 10 2011 121 374

(51) Int. Cl.
*G06F 7/70* (2006.01)
*G06F 19/00* (2011.01)
(Continued)

(52) U.S. Cl.
CPC .................. *B60T 8/1708* (2013.01)

(58) Field of Classification Search
CPC combination set(s) only.
See application file for complete search history.

(56) References Cited

U.S. PATENT DOCUMENTS 6,127,939 A * 10/2000 Lesesky .............. B60R 16/0315
                                                           303/122
6,970,772 B2 * 11/2005 Radtke ................... H04B 3/548
                                                           303/122.06
(Continued)

FOREIGN PATENT DOCUMENTS

DE   102 16 564 A1   10/2003
EP   1 717 121 A1    11/2006
EP   2 060 457 A1    5/2009

OTHER PUBLICATIONS

International Search Report of PCT/EP2012/005222, mailed May 3, 2013.

*Primary Examiner* — Bhavesh V Amin
(74) *Attorney, Agent, or Firm* — Collard & Roe, P.C.

(57) ABSTRACT

A means for wiring a heavy load vehicle module to connect and disconnect a multiplicity of data cables to conduct and transmit brake signal data to an electronic braking system of the heavy load vehicle module, wherein the electronic braking system comprises a data input to receive the brake signal data and a data output to transmit the brake signal data, and connects among the multiplicity of data cables one data cable to the data input of the electronic braking system and another data cable to the data output of the electronic braking system, and disconnects the remaining data cables, wherein the multiplicity of data cables is greater than or equal to four. Furthermore, an electronic braking system for a heavy load vehicle module, and one such for a heavy load vehicle, with a means for wiring, is described.

9 Claims, 6 Drawing Sheets

Figure 1:
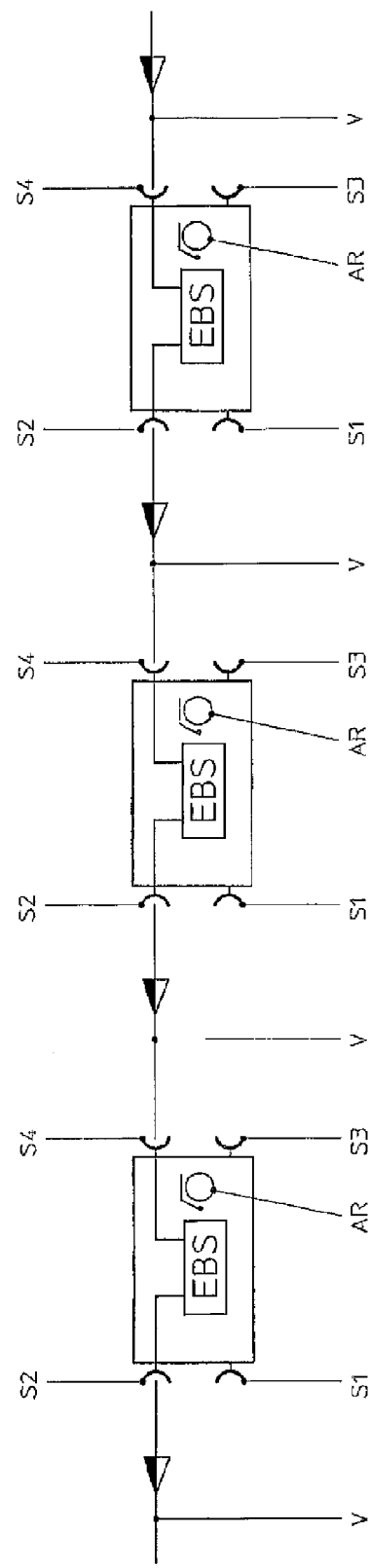

(51) Int. Cl.
    *G06G 7/00*     (2006.01)
    *G06G 7/76*     (2006.01)
    *B60T 8/17*     (2006.01)

(56) References Cited

U.S. PATENT DOCUMENTS

| | | | | |
|---|---|---|---|---|
| 7,286,046 B2 * | 10/2007 | Kinsey | B60Q 11/00 303/123 |
| 7,712,760 B2 * | 5/2010 | Ohtomo | B60L 15/38 104/87 |
| 7,971,942 B2 * | 7/2011 | Parrott | B60T 7/20 303/118.1 |
| 8,082,086 B2 * | 12/2011 | Heise | B60T 13/66 188/3 R |
| 8,540,323 B2 * | 9/2013 | Broch | B60T 8/1708 188/112 R |
| 8,935,435 B2 * | 1/2015 | Reidt | H04L 12/40013 710/1 |
| 2005/0029859 A1 * | 2/2005 | Bensch | B60T 7/10 303/89 |
| 2006/0192427 A1 * | 8/2006 | Lesesky | B60R 16/0315 303/122 |
| 2009/0120747 A1 * | 5/2009 | Heise | B60T 13/66 188/3 H |

* cited by examiner

CABLING DEVICE AND ELECTRONIC BRAKE SYSTEM FOR A MODULAR HEAVY GOODS VEHICLE AND FOR A HEAVY GOODS VEHICLE

CROSS REFERENCE TO RELATED APPLICATIONS

This application is the National Stage of PCT/EP2012/005222filed on Dec. 18, 2012, which claims priority under 35 U.S.C. §119 of German Application No. 10 2011 121 374.4 filed on Dec. 19, 2011, the disclosure of which is incorporated by reference. The international application under PCT article 21(2) was not published in English.

The invention relates to a wiring system for a heavy load vehicle module, an electronic braking system for a heavy load vehicle module, as well as an electronic braking system for a heavy load vehicle.

Heavy load vehicle modules, also known as modular heavy load vehicles, serve for flexible and economical transportation of heavy loads in the cargo load range from 80 t to much larger than 10000 t, wherein multiple heavy load vehicle modules are combined into a heavy load vehicle suitable for transport, according to the requirements of the cargo to be transported. The heavy load vehicle modules here may be connected with one another both in lengthwise as well as in transverse direction.

Such a heavy load vehicle module comprises a vehicle chassis with for example a box-shaped central support and stable lateral supports, as well as a reinforced loading surface to accept the load. A heavy load vehicle module typically comprises multiple axles with single or dual tires, wherein depending on the loading, a hydraulic axle adjustment of the individual axles may be connected to various supporting circuits, in order to ensure equal loading on each axle. Steering of a heavy load vehicle module typically occurs via an all-wheel positive steering.

Such types of heavy load vehicle modules are of course equipped with brakes and correspond in their design to the braking systems for commercial vehicles, as they are described (for example) in Bosch: "*Kraftfahrtechnisches Taschenbuch*" ("Powered vehicle technical manual"), pp. 674-701, 23rd Edition, Braunschweig, 1999. A brake command is transmitted via a pneumatic control connection in known braking systems for commercial vehicles, in particular for vehicle trailers.

To optimize the braking process, the electronic braking system (EBS) with anti-lock braking systems (ABS) and anti-slip regulation (ASR) were thus introduced for commercial vehicles, wherein the braking components are connected to one another and are controlled via a CAN ("controller area network") bus. An electro-pneumatic service braking system remains available as an underlying safety level. The electronic braking system EBS has meanwhile become state of the art in standard trailer vehicle design and also offers advantages for special vehicle design. The braking command is thus transmitted faster from the driven vehicle to the trailer module via the CAN bus, additional information can be transmitted via the CAN bus, and the anti-blocking system integrated in the electronic braking system has an improved control cycle than the normal anti-blocking system. The electronic trailer braking system will also be designated as TEBS (Trailer EBS).

For commercial vehicles in combination with more than one trailer, which are also designated as "roadtrains", trailers whose design requires a length of CAN conductors of more than 18 meters, or trailers whose design requires more than one TEBS, an amplifier/splitter must be used for the CAN bus, in order to securely conduct the braking signals via the CAN bus to each respective TEBS or electronic trailer braking system, or also to transmit them further. Such types of amplifier/splitter modules are designated as trailer roadtrain modules, or abbreviated as TRM, and are produced and marketed for example by the company Knorr Bremse Group. Further information about electronic braking systems for commercial vehicles and trailer roadtrain modules may be found on the website "www.knorr-bremse.com".

A TRM comprises at least three connectors. Here the "front" connector serves to connect the forward vehicle or the connector coming to the drive vehicle, the exiting "local" connector serves to transmit the CAN bus to the local TEBS, and the "rear" connector serves to transmit the CAN signals to the TRM of the next vehicle or the TEBS of the last vehicle in the chain. A fourth connector in a TRM serves to connect external pressure sensors, which generate a braking command to the local electronic braking system, building on the electro-pneumatic service braking system as underlying safety level.

Special vehicles, in particular the above mentioned heavy load vehicle modules, may be moved in both directions of travel, and may be connected both in lengthwise as well as in transverse direction. The use of electronic braking systems in heavy load vehicle modules implies for their combination to form a heavy load vehicle that a CAN bus must be formed to transmit the brake command to the local electronic braking systems, wherein the flexibility characteristics of the heavy load vehicle modules must remain intact.

The document DE 102 16 564 A1 relates a process for data exchange in a vehicle train, in which the individual vehicles are connected and communicate with one another via a PCL data bus. Here a vehicle train consists of a motor vehicle and at least one trailer, wherein the trailers are coupled to the motor vehicle. Furthermore, additional trailers may also be coupled to these trailer(s). In addition to the mechanical coupling, all of the vehicle electronics present in the vehicles are connected with one another via a PLC data bus, whereby the vehicle electronics are typically designed as ABS control electronics.

Additional programmable output and input functions are provided in at least one of the trailer's ABS control electronics, which extend beyond the inherent ABS operations, and serve to perform additional service operations in this vehicle. Here the at least one trailer's ABS control electronics with additional functions automatically and cyclically transmits the additional programmable functionalities implemented therein via the PLC data bus to all other ABS control electronics, which are thus able to determine the currently programmed functionalities there. The control of these additional functions in the trailer's vehicle electronics equipped with these specific functionalities will then be operated via an input/output device provided in the motor vehicle, which is either directly or indirectly connected to the PLC data bus via the motor vehicle ABS control electronics.

The document EP 2 060 457 A1 concerns brake control module for an initial trailer of a powered load-bearing vehicle, with a tractor vehicle interface that comprises: a tractor vehicle CAN interface to connect with a tractor vehicle CAN connector of a tractor vehicle, a tractor vehicle power supply interface to connect with a tractor vehicle power supply connector of the tractor vehicle, and a tractor vehicle warning light interface to connect with a tractor vehicle warning light connector of the tractor vehicle; and with a secondary trailer interface to connect a secondary trailer that is coupled to the initial trailer, which comprises a secondary trailer CAN interface to connect with a secondary trailer CAN connector of the secondary trailer, a secondary trailer power supply interface to connect with a power connector of the secondary trailer, and a secondary trailer warning light interface (44) to connect with a secondary trailer warning light connector (46) of the secondary trailer.

In addition, the document EP 1 717 121 A1 concerns a bus system for power supply and communications in a tractor-trailer, composed of a tractor vehicle and a semi-trailer, wherein the bus system resides in the ABS module of the tractor vehicle: The bus system comprises a bus controller with a bus protocol and at least one bus connector, which is electrically connected to the ABS processor, a power source, and at least one additional system that is electrically connected with the bus connector, such as sensors or actuators.

The invention therefore has the purpose of creating a means for wiring heavy load vehicle modules, an electronic braking system for a heavy load vehicle module, as well as an electronic braking system for a heavy load vehicle, composed of heavy load vehicle modules, while preserving the flexibility of the heavy load vehicle modules.

This purpose is fulfilled by a wiring system with the characteristics described herein, an electronic braking system for a heavy load vehicle module with the characteristics described herein, as well as by an electronic braking system for a heavy load vehicle with the characteristics described herein. Preferred embodiments of the invention are also described herein.

The means for wiring a heavy load vehicle module according to the invention for connecting and disconnecting a multiplicity of data cables to conduct and transmit brake signal data to an electronic braking system of the heavy load vehicle module, wherein the electronic braking system comprises a data input to receive the brake signal data and a data output to transmit the brake signal data, switches among the multiplicity of data cables to connect one data cable to the data input of the electronic braking system and another data cable to the data output of the electronic braking system, and disconnects the remaining data cables, wherein the multiplicity of data cables is greater than or equal to four. For this purpose, the means for wiring comprises a switching logic to select both of the data cables to be connected to the electronic braking system, and the data cables to be disconnected, wherein disconnected data cables are galvanically separated from the means for wiring.

The data cables are furthermore preferably provided with an encoding, by means of which the switching logic makes a selection. Here the encoding occurs preferably by a voltage application to predetermined conductors of the data cables.

The electronic braking system for a heavy load vehicle module according to the invention, which comprises an electronic braking system with a data input to receive the brake signal data and a data output to transmit the brake signal data, wherein the electronic braking system comprises data cables to conduct and transmit brake signal data, includes:
   a means for wiring as described above, and
   four data cables to conduct and transmit brake signal data, wherein each data cable comprises a socket on one end and is connected at the other end with the means for wiring.

The electronic braking system of a heavy load vehicle module preferably comprises an amplifier/splitter module TRM, and an electronic braking system module TEBS.

In addition, a socket is preferably arranged at each corner of the heavy load vehicle module. A flexible connection of heavy load vehicle modules is thus possible in all combinations and the sockets are easily accessible.

The data cables of an electronic braking system of a heavy load vehicle module preferably comprise a CAN bus to transmit the braking data signals to the braking system. The use of CAN buses in vehicles is typical, but the possibility to use other bus systems also exists.

Preferably, a data cable comprises n conductors, wherein n is greater than or equal to four. Here two conductors are used for the CAN bus, and two conductors serve for encoding and to control the switching logic of the means for wiring. For example, in a preferred embodiment 10 conductors form data cables used in a heavy load vehicle module, wherein in addition to the conductors for the CAN bus and the encoding, the additional conductors serve to transmit signals and necessary voltages.

The electronic braking system according to the invention for a heavy load vehicle of N heavy load vehicle modules coupled with one another, wherein N is greater than or equal to two, comprises an electronic braking system described above for each heavy load vehicle module, wherein the electronic braking systems of the heavy load vehicle modules are connected together among one other by connector cables arranged between the heavy load vehicle modules, so that a linear bus, in particular a CAN bus, is produced from the first to the last electronic braking system of the heavy load vehicle modules, to control the electronic braking systems of the heavy load vehicle modules.

Preferably, the connector cables arranged between the heavy load modules are directionally dependent. In other words, the connector cables have a front and a rear end, wherein the front end must be connected with a preceding heavy load vehicle module, and the rear end with a following heavy load vehicle module in CAN direction.

Figure 2:
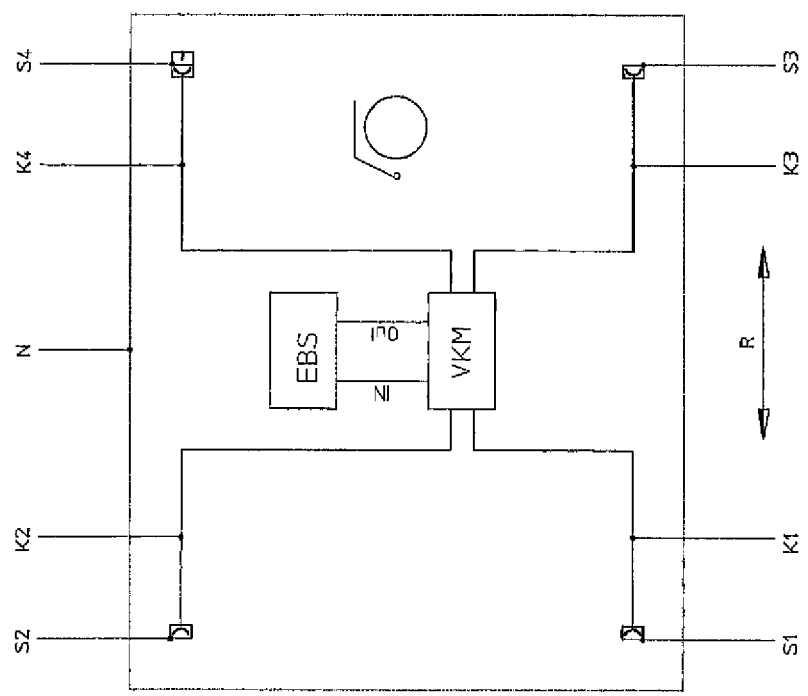
Figure 3:
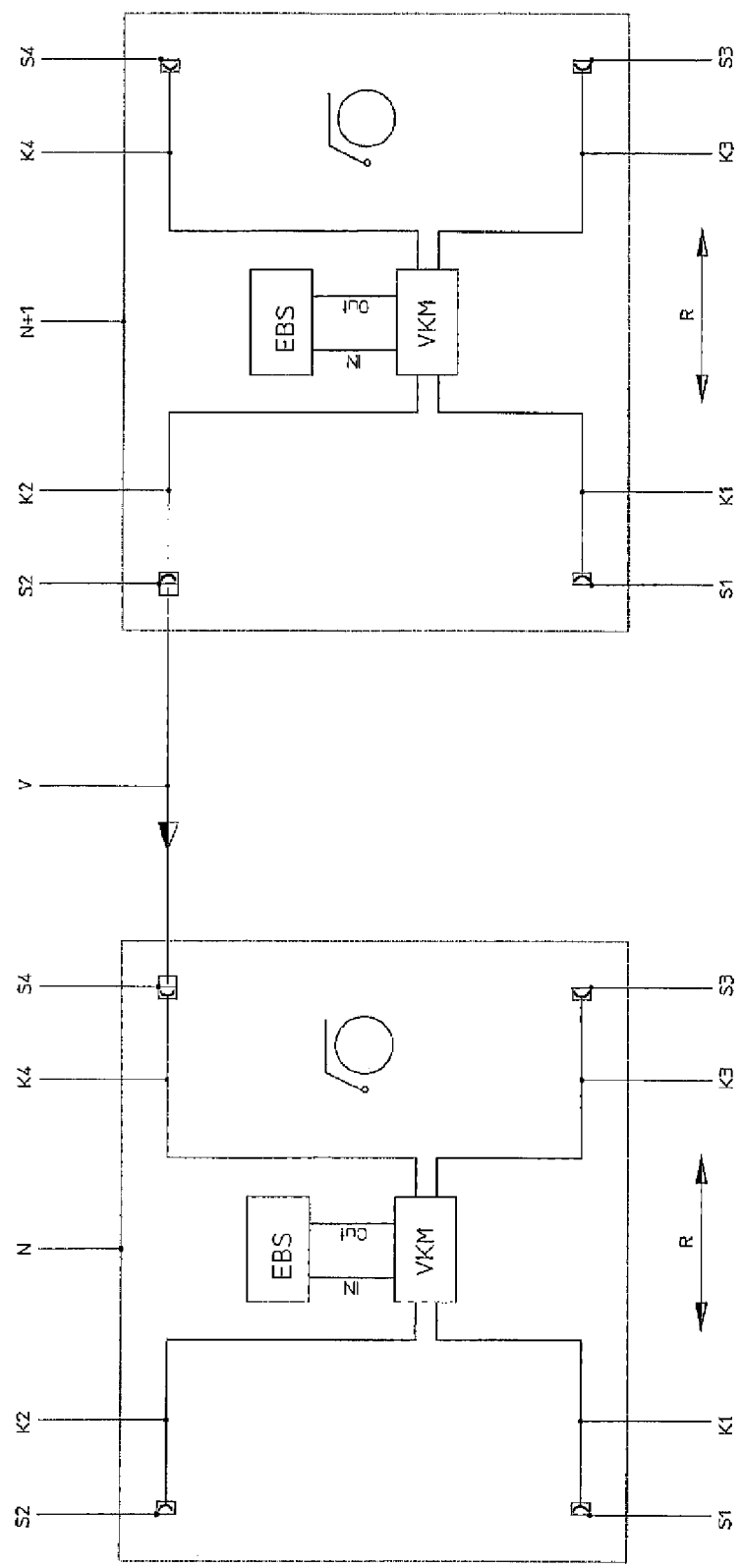
Figure 4:
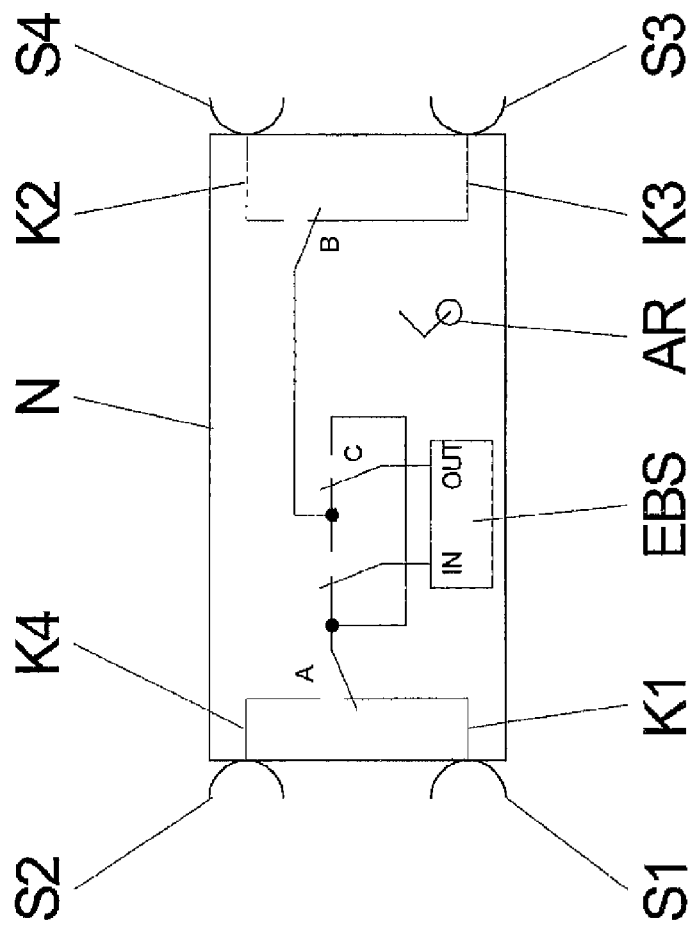
Figure 5:
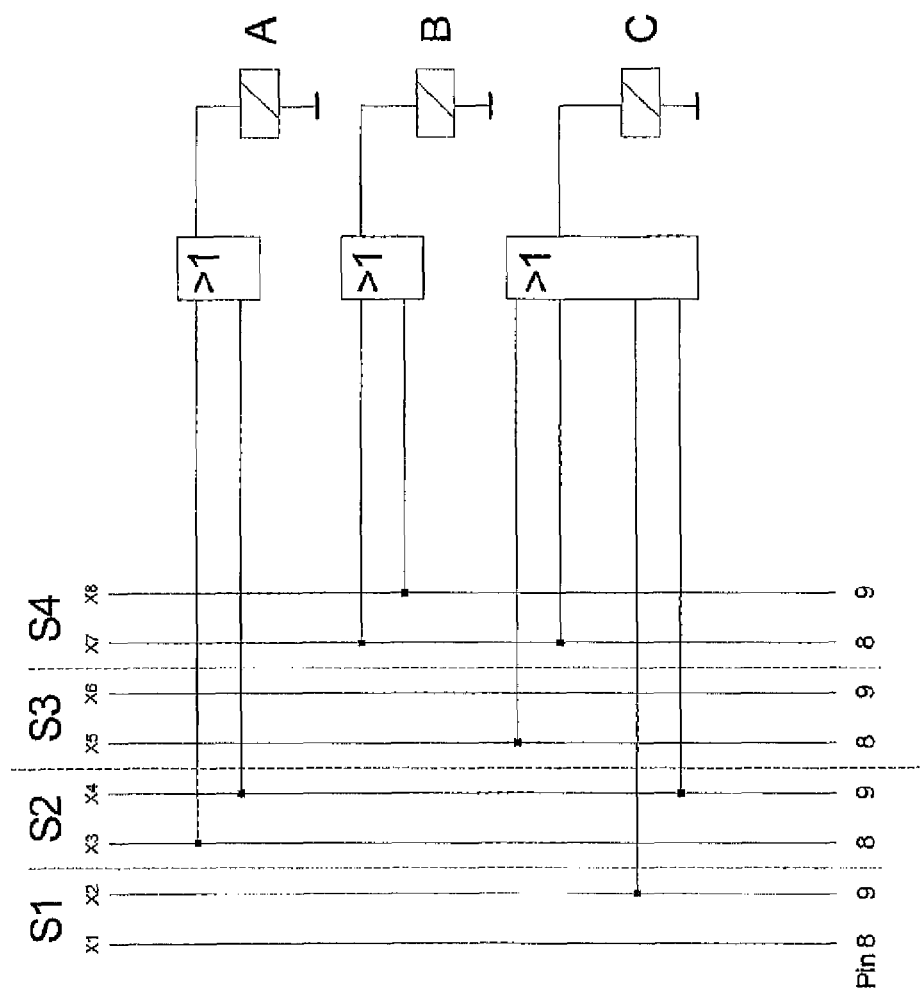
Figure 6:
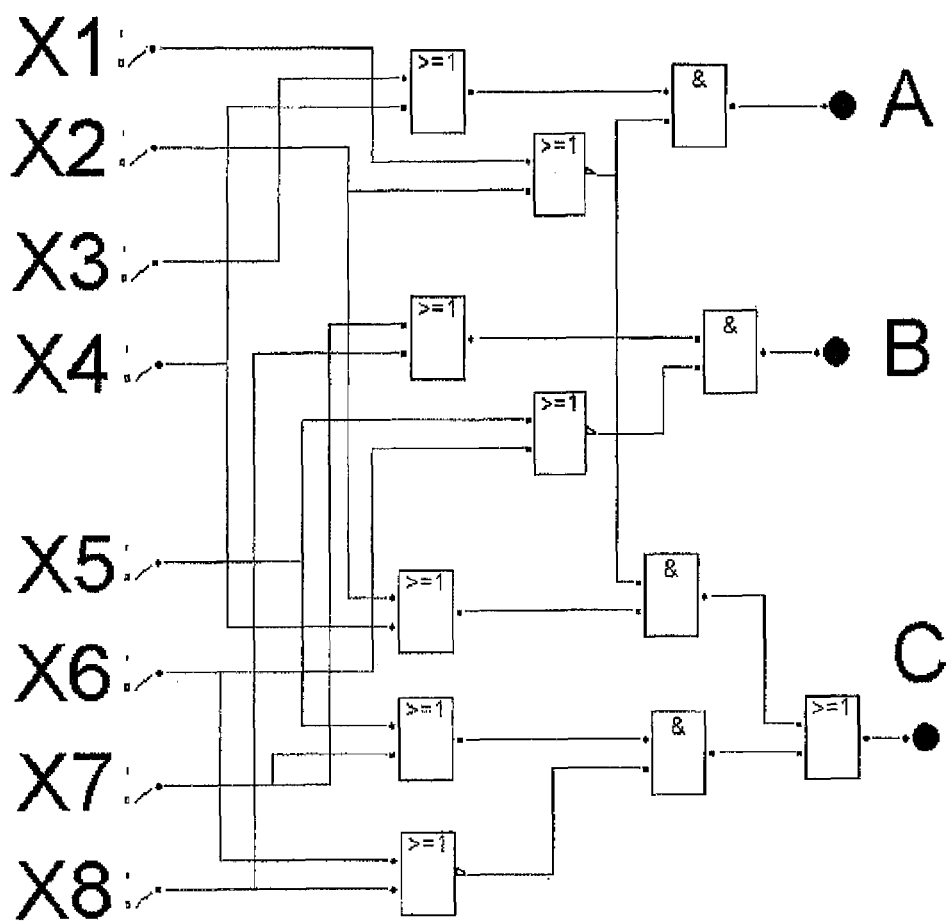

Preferred embodiments of the invention are explained on the basis of the illustrations as follows; here is shown:

FIG. 1 A combination of multiple heavy load vehicle modules in a schematic view, FIG. 2 A heavy load vehicle module with electronic braking system and a means for wiring, FIG. 3 A combination of two heavy load vehicle modules in a schematic view, FIG. 4 A means for wiring a heavy load vehicle module in relay form, FIG. 5 An implementation of the means for wiring in FIG. 4, and FIG. 6 An additional implementation of the means for wiring in FIG. 4.

FIG. 1 shows a section of a combination of multiple heavy load vehicle modules to a heavy load vehicle, wherein in FIG. 1 three heavy load vehicle modules N−1, N, N+1 are shown. Each heavy load vehicle module comprises an axle direction AR, which is specified by the position of the hinged joint of the axle aggregate. Thus a basis direction will be defined for each heavy load vehicle module, and "front" is the direction in which the hinged joint points. The left and right sides of a heavy load vehicle module N−1, N, N+1 are thus also specified. This definition applies only to the individually examined vehicle chassis of the heavy load vehicle module. In combinations of heavy load vehicle modules, the vehicle chassis may also be exchanged, meaning coupled front with front and rear with rear. Furthermore, a lateral combination with free associations of the axle directions AR is also possible.

Each heavy load vehicle module N−1, N, N+1 comprises a socket at each corner, wherein the socket S1 at the left front corner, the socket S2 at the right front corner, the socket S3 at the rear left corner and the socket S4 at the rear right corner arranged are. Furthermore, each heavy load vehicle module comprises an electronic braking system EBS, which serves to brake the heavy load vehicle modules N−1, N, N+1. Such a type of braking system for a heavy load vehicle module comprises for example a TRM and a TEBS, as was initially explained.

The heavy load vehicle modules are connected in the example in FIG. 1 via the right-side sockets S2 and S4 by means of respective connector cables V, wherein a CAN bus will be implemented via the connector cables to conduct the braking signal to the electronic braking system EBS. Here, each electronic braking system EBS of a heavy load vehicle module N−1, N, N+1 has exactly one input for the CAN bus and exactly one output to transmit the CAN bus to the subsequent heavy load vehicle module.

A detailed view of the internal data cable connections of a heavy load vehicle module can been seen in FIG. 2. The heavy load vehicle module N is shown, which possesses a multiplicity of axles. The first axle in the heavy load vehicle module in FIG. 2 should be arranged on the left, so that the illustrated basis direction AR is obtained. Each corner of the heavy load vehicle module comprises a socket S1, S2, S3, S4, by means of which multiple heavy load vehicle modules may be connected with one another.

From the sockets S1, S2, S3, S4, internal data cables K1, K2, K3, K4 lead to a means for wiring. The means for wiring VKM has the purpose of selecting two data cables from the data cables K1, K2, K3, K4 as a function of the socket arrangement and so to connect the electronic braking apparatus EBS of the heavy load vehicle module N, so that a linear CAN bus results. Here the electronic braking system EBS has a CAN bus input IN and a CAN bus output OUT. The input 1N and the output OUT of the electronic braking system EBS are not exchangeable, but instead the input IN of the heavy load vehicle module N in question must be connected with the CAN bus output of the previous heavy load vehicle module N−1, and the output OUT must be connected to the input of the subsequent heavy load vehicle module N+1. Should the heavy load vehicle module in question be the first module, then input IN of the electronic braking system must be connected with the output of the master module typically arranged in the tractor vehicle. If the heavy load vehicle module in question is the last module in the combination, then the CAN bus ends at this heavy load vehicle module.

To select the required internal data cables K1, K2, K3, K4, the means for wiring VKM comprises a switching logic, via which signals will be controlled, which are applied via the plugs of the connector cables V to the sockets S1, S2, S3, S4 of the internal data cables K1, K2, K3, K4. In addition, the switching logic in the means for wiring VKM ensures that not disconnected data cables K1, K2, K3, K4 are electrically isolated from the means for wiring VKM or the electronic braking apparatus, and thus cannot act as antennas.

FIG. 3 shows two heavy load vehicle modules N, N+1 that are connected with one another via a connector cable V, wherein the connector cable V connects the right rear socket S4 of the preceding heavy load vehicle module N with the right front socket S2 of the following heavy load vehicle module N+1. Here the connector cable V is directionally dependent, which is indicated by the arrow. Here connection dependent means that the front end of the connector cable V must be aligned in direction of the preceding heavy load vehicle module N, in other words in the direction of the master module in the tractor vehicle, and the rear end in direction of the subsequent heavy load vehicle module N+1.

The switching logic of the means for wiring VKM of the preceding heavy load vehicle module N must now ensure that the internal data cable K4 is connected with the CAN output OUT of the electronic braking system EBS of the preceding heavy load vehicle module N, whereas that of the means for wiring VKM of the subsequent heavy load vehicle module N+1 is connected with the CAN input IN of the electronic braking system EBS for the subsequent heavy load vehicle module N+1. Furthermore, each respective switching logic must ensure that unneeded internal data cables are electrically disconnected.

FIG. 4 shows a possible implementation of the switching logic of a means for wiring on the basis of a schematically represented heavy load vehicle module N, with sockets S1, S2, S3, S4 arranged at each corner, and corresponding internal data cables K1, K2, K3, K4, as well as the electronic braking system EBS with the CAN input IN and the CAN output OUT, wherein the fundamental direction AR is also indicated.

Here the switching logic in the means for wiring is implemented through three relays A, B, and C. Here the relay A switches between the internal data cables K1, K2 of the front sockets S1 and S2, the relay B switches between the internal data cables K3 and K4 of the rear sockets S3 and S4, and the relay C switches between the input IN and the output OUT of the electronic braking system EBS. In other words, the relay A switches between left front and right front, the relay B switches between left rear and right rear, and the relay C switches between front and rear.

In FIG. 4 the basis condition is shown for the switching logic implemented through the three relays A, B, C, in that the left front socket S1 is connected with the CAN input IN of the electronic braking system apparatus EBS, and the left rear socket S3 is connected with the CAN output OUT of the electronic braking system apparatus EBS. Therefore, in the unpowered basis condition of the CAN bus, the left front CAN socket S1 is connected through to the left rear socket S3. By application of suitable encoding signals to the sockets, the switching logic must for example determine whether a socket, for example S2, is connected to a rear plug of a connector cable and another socket, thus S1, S3, or S4, is connected to a front plug of a connector cable.

FIG. 5 shows an implementation of the automatic selection in the means for wiring by extending the available plug connectors of the connector cable V between heavy load vehicle modules, so that an encoding will be implemented. In addition, two otherwise unneeded pins in both plugs of a connector cable V are used, which by means of connections within each of the respective plugs front encoding and a rear encoding is obtained via an application of voltage Ub+. The voltage supply UB+ occurs through the master module preferably arranged in the tractor vehicle, by means of switching on the starter.

Here, a front signal will be applied to one pin of the front plug, for example pin 8 of the connector cable V, and a rear signal will be applied to another pin of the rear plug, for example pin 9 of the connector cable V. This voltage UB+ applied to the coding pins will be evaluated in a local selective logic as front/rear signal, and the inputs or outputs will be associated and switched on the electronic braking system BBS. In addition, a left or right signal, respectively front and rear must be evaluated, which is also implemented via both of these encoding pins, since the connector cables V in use have a uniquely defined installation direction, and the connectors in use to the front pin and/or to the rear pin define them as front or rear.

Two connectors are defined respectively in the sockets S1, S2, S3, and S4, via which the selection signal reaches the switching logic. These connectors are X1 and X2 for the left front socket S1; X3 and X4 for the right front socket S2; X5 and X6 for the left rear socket S3; and X7 and X8 for the right rear socket S4. Here the front signal is applied to the connectors X1, X3, X5, and X7, and the rear signal is applied to the connectors X2, X4, X6, and X8.

In the first preferred embodiment, high-quality HF-suitable relays are used for switching the CAN signals, since they offer a low transmission resistance, electrical isolation, and a large signal voltage range (here 24V CAN bus).

This means on the basis of relay A in FIG. 5, which determines the switching between left front and right front, that in unpowered condition it assumes the basis position left front shown in FIG. 4, meaning that it switches the CAN signal, which lies on the left front socket S1, to the electronic braking system apparatus. Therefore, the encoding signals of the left front socket must not be evaluated. For a plug connection right front via the socket S2, the relay A must switch, meaning that the signal X3 "right front" must be evaluated.

Now is it possible that the vehicle chassis stands in opposite direction to the direction of travel, and the connection has been correctly plugged on the right side. In this case, the left rear connection X5 locally with regard to the vehicle chassis would be connected and powered. Relay B must therefore remain unpowered and the CAN signal will be transmitted to the electronic braking system apparatus on the plugged-in side. Since X5 is powered on socket S3, the logic switches the relay C, wherein the CAN signal OUT is switched to IN and the CAN bus preserves the correct direction.

Since the signal to switch relay A may come either from X3 or from X4, both signals are logically combined with an OR operator. The same principles apply to the relays B and C, so that the logical switching shown in FIG. 5 results. Since only logical OR operators are present, this switching can be implemented for example via diode logic.

FIG. 6 shows an additional embodiment of the logical switching in the means for wiring according to the invention, wherein a extended evaluation of the signals X1 to X8 applied to the sockets occurs. By this extended evaluation of the signals, cases are also covered in which (for example) more than two connector cables are plugged between two heavy load vehicle modules.

With the assistance of Karnaugh diagrams in the disjunctive standard form, and the Boolean equations derived from them, the logical switching shown in FIG. 6 is obtained. The left or right signals will be recognized for all possible combinations investigated, meaning that in practice a connection between the CAN bus to other vehicle chassis will always be obtained. Also if/when double connections are combined, the switching will always only be determined via one dominant one, since no direction must be preserved in the coupling.

In the following table, the significant connections of the possible connections between heavy load vehicle modules with four sockets S1 to S4 arranged at the corners are shown:

TABLE 1

|    | X1 | X2 | X3 | X4 | X5 | X6 | X7 | X8 | A | B | C |
|----|----|----|----|----|----|----|----|----|---|---|---|
| 1  | 1  | 0  | 0  | 0  | 0  | 1  | 0  | 0  | 0 | 0 | 0 |
| 2  | 0  | 0  | 1  | 0  | 0  | 0  | 0  | 1  | 1 | 1 | 0 |
| 3  | 1  | 0  | 0  | 0  | 0  | 0  | 1  | 0  | 1 | 0 | 0 |
| 4  | 0  | 0  | 1  | 0  | 0  | 1  | 1  | 0  | 1 | 0 | 0 |
| 5  | 0  | 0  | 0  | 1  | 0  | 0  | 0  | 0  | 1 | 1 | 1 |
| 6  | 0  | 0  | 0  | 0  | 1  | 0  | 1  | 0  | 0 | 0 | 1 |
| 7  | 0  | 1  | 0  | 0  | 0  | 0  | 0  | 0  | 1 | 1 | 1 |
| 8  | 0  | 0  | 0  | 1  | 1  | 0  | 0  | 0  | 1 | 0 | 1 |
| 9  | 1  | 0  | 0  | 0  | 0  | 0  | 0  | 0  | 0 | 0 | 0 |
| 10 | 0  | 0  | 1  | 0  | 0  | 0  | 0  | 0  | 1 | 0 | 0 |
| 11 | 0  | 0  | 0  | 0  | 0  | 0  | 1  | 0  | 0 | 1 | 1 |
| 12 | 0  | 0  | 0  | 0  | 1  | 0  | 0  | 0  | 0 | 0 | 1 |

Here column 1 contains the number of the wiring variation and the first line the binary variables X1 to X8 as well as the resulting logical dimensions A, B, and C to switch the internal data cables K1, K2, K3, and K4, as is shown in FIG. 4. Thus, the associations given in line 1 of Table 1 state that the front signal lies on the X1 pin of the left front socket S1 through the connection to the rear end of the connector cable, whereas the rear signal lies on the X6 pin of the left rear socket through the connection with the front end of the connector cable there. Therefore, the CAN bus will be switched from left front to left rear, as is shown in the basis condition in FIG. 4. The remaining 11 variations in Table 1 are self-explanatory.

LIST OF REFERENCE FIGURES

AR Axial direction
A Relay
B Relay
C Relay
EBS Electronic Braking System
IN CAN Input EBS
OUT CAN Output EBS
K1 Cable 1
K2 Cable 2
K3 Cable 3
K4 Cable 4
N−1 Heavy load vehicle module
N Heavy load vehicle module
N+1 Heavy load vehicle module
R Direction of travel
S1 Left front socket
S2 Right front socket
S3 Left rear socket
S4 Right rear socket
V Connection cable
VKM Means for wiring
X1 Dual variable socket S1
X2 Dual variable socket S1
X3 Dual variable socket S2
X4 Dual variable socket S2
X5 Dual variable socket S3
X6 Dual variable socket S3
X7 Dual variable socket S4
X8 Dual variable socket S4

The invention claimed is:
1. A wiring system for wiring a heavy load vehicle module for switching a multiplicity of data cables on and off in order to conduct and transmit brake signal data to an electronic braking system of the heavy load vehicle module, wherein the electronic braking system comprises a data input to receive the brake signal data and a data output to transmit the brake signal data, wherein the multiplicity of data cables is greater than or equal to four, each data cable comprising a CAN bus, wherein among the multiplicity of data cables, the wiring system connects one data cable to the data input of the electronic braking system and another data cable to the data output of the electronic braking system, and disconnects the remaining data cables, wherein the wiring system comprises a switching logic to select both of the data cables to be connected to the electronic braking system and the remaining data cables to be disconnected, and wherein disconnected data cables are galvanically separated from the wiring system.

2. The wiring system according to claim 1, wherein encodings are applied to the data cables, and wherein the switching logic may make a selection via the encodings.

3. The wiring system according to claim 2, wherein the encoding occurs by a voltage application to predetermined conductors in the data cable.

4. An electronic braking system for a heavy load vehicle module, with an electronic braking system comprising a data input to receive the brake signal data and a data output to transmit the brake signal data, wherein the electronic braking system further comprises data cables for the application and transmission of brake signal data, wherein the electronic braking system further comprises a wiring system for wiring the heavy load vehicle module and for switching the data cables on and off in order to conduct and transmit the brake signal data to the electronic braking system, wherein the wiring system connects a first data cable to the data input of the electronic braking system and a second data cable to the data output of the electronic braking system, and disconnects the remaining data cables, wherein the wiring system comprises a switching logic to select the first and second data cables to be connected to the electronic braking system and the remaining data cables to be disconnected, and wherein the disconnected data cables galvanically and separated from the wiring system, and has four data cables to conduct and transmit brake signal data, each data cable comprising a CAN bus to transmit the braking data signals to the electronic braking system, and wherein each data cable comprises a socket on one end and is connected to the wiring system on the other end.

5. The electronic braking system according to claim 4, wherein the electronic braking system further comprises an amplifier/splitter module and an electronic braking system module.

6. The electronic braking system according to claim 4, wherein each corner of the heavy load vehicle module comprises a respective socket.

7. The electronic braking system according to claim 4, wherein the data cables comprise n conductors, where n is greater than or equal to four, and wherein two conductors of the n conductors serve the CAN bus and two other conductors of the n conductors serve for encoding and controlling the switching logic of the wiring system.

8. An electronic braking system for a heavy load vehicle comprising N heavy load vehicle modules connected to one another, wherein N is greater than or equal to two, wherein the electronic braking system comprises N electronic braking systems, wherein each electronic braking system of the N electronic braking system comprises a data input to receive the brake signal data and a data output to transmit the brake signal data, data cables for the application and transmission of brake signal data, a wiring system for wiring the heavy load vehicle module and for switching the data cables on and off in order to conduct and transmit the brake signal data to the electronic braking system, wherein the wiring system connects a first data cable to the data input of the electronic braking system and a second data cable to the data output of the electronic braking system, and disconnects the remaining data cables, wherein the wiring system comprises a switching logic to select the first and second data cables to be connected to the electronic braking system and the remaining data cables to be disconnected, and wherein the disconnected data cables are galvanically separated from the wiring system, and four data cables to conduct and transmit brake signal data, each data cable comprising a CAN bus to transmit the braking data signals to the electronic braking system, wherein each data cable comprises a socket on one end and is connected to the wiring system on the other end, and wherein the electronic braking systems are connected to one another by a connector cables arranged between the heavy load vehicle modules so that a linear bus is produced from a first electronic braking system of the electronic braking systems to the last electronic braking system of the electronic braking systems, to control the electronic braking systems of the N heavy load vehicle modules.

9. The electronic braking system according to claim 8, wherein the connector cables arranged between the heavy load vehicle modules are directionally dependent.

* * * * *

UNITED STATES PATENT AND TRADEMARK OFFICE
CERTIFICATE OF CORRECTION

PATENT NO. : 9,725,078 B2  Page 1 of 1
APPLICATION NO. : 14/366406
DATED : August 8, 2017
INVENTOR(S) : Boeer et al.

It is certified that error appears in the above-identified patent and that said Letters Patent is hereby corrected as shown below:

In the Claims

In Column 9, Line 47 (Line 22 of Claim 4) before the word "galvanically" please insert: --are--.

In Column 10, Line 43 (Line 31 of Claim 8) after the word "by" please delete: "a".

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*